July 6, 1965  J. MÜLLER  3,192,832
TRACER MILLING MACHINE
Filed Nov. 15, 1963  2 Sheets-Sheet 1
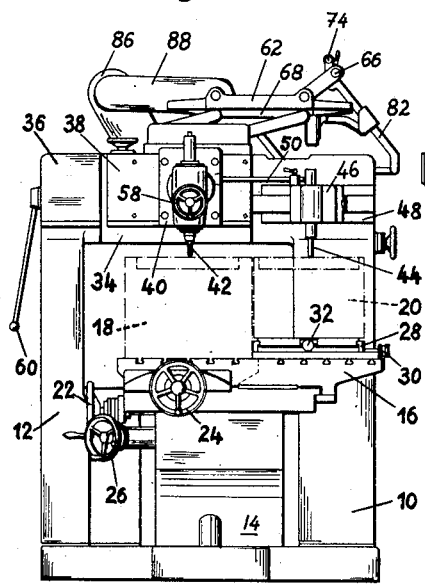
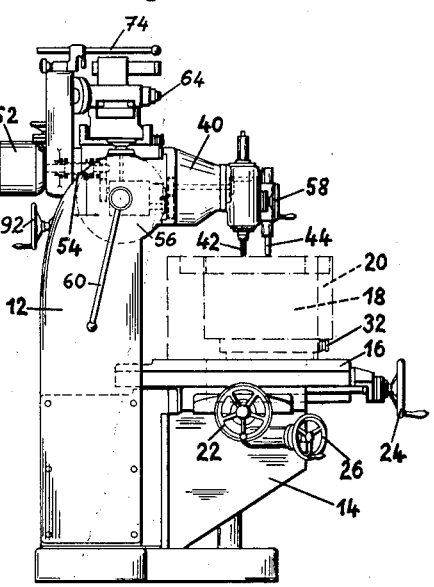
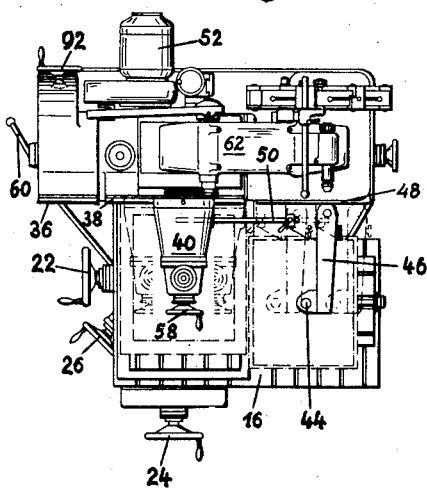
INVENTOR.
JOHANN MÜLLER
BY Rupert J. Brady
ATTORNEY July 6, 1965 J. MÜLLER 3,192,832
TRACER MILLING MACHINE Filed Nov. 15, 1963 2 Sheets-Sheet 2

INVENTOR.
JOHANN MÜLLER
BY
*Rupert J. Brady*
ATTORNEY została opublikowana patent

United States Patent Office 3,192,832
Patented July 6, 1965

3,192,832
TRACER MILLING MACHINE
Johann Müller, Munich, Germany, assignor to Hans Deckel, Munich, Germany, and Friedrich Wilhelm Deckel, Zug, Switzerland
Filed Nov. 15, 1963, Ser. No. 323,934
Claims priority, application Germany, Nov. 21, 1962, D 40,325
11 Claims. (Cl. 90—13.1)

This invention relates broadly to machine tools and more particularly to a tracer milling machine having one tool for roughing operations and another tool for finishing operations, which tools are alternately shifted into operating position.

Designs for tracer milling machines on which both roughing operations and subsequent finishing operations are to be performed are well known in the prior art. Usually in machines of this type the same tool is used for both the roughing and finishing operations. The finishing device is normally freely movable in three directions and directly guided by hand, and is connected to the machine column by means of a clamping arm. When roughing operations are performed by the finishing device, feed and depth-of-cut motions are assigned to the work piece table. However, experience has shown that this design is not sufficiently rugged for heavy roughing operations, because the finishing device in itself must be built relatively light in order for it to be guided directly by hand during the finishing portion of the operation. For this reason, it has been proposed in the art to provide one tool each for roughing and finishing, each with its own feeler or stylus. Both tools, which in this case are better adapted for their respective uses, are brought into operating position alternately, usually by shifting them along horizontal guides on the machine column. However, this arrangement usually results in a large cumbersome machine and it is often times difficult to obtain the ruggedness necessary for exact machine operation on large work pieces.

It is therefore one of the objects of the invention to provide a tracer milling machine which is exceptionally rugged in construction and provides a movable tool head designed to more favorably counteract bending moments than the tool heads of prior art tracer milling machines, to produce precise machining operations.

Another object of the invention is to provide a novel construction of tracer milling machine having separate roughing and finishing tools mounted in a novel manner on a common tool head, with each tool having an independent tracer.

Another object of the invention is to provide a construction of tracer milling machine having separate roughing and finishing tools in which the feeler for the roughing tool to a high degree is independent of vibrations during the roughing operations.

A further object of the invention is to provide a construction of tracer milling machine in which the roughing and finishing tools are disposed at right angles to each other and are alternately brought into operating position by movement about a horizontal axis.

Still another object of the invention is to provide a tracer milling machine with separate roughing and finishing tools which requires a minimum amount of floor space, utilizes the usually wasted space above the machine to good advantage, and is constructed so that the tools can be easily moved to completely clear the space above the table so heavy work pieces can be lowered by crane onto the table without encountering any obstacles.

Other and further objects of the invention reside in the manner in which the roughing tool can be moved to a nonuse position on the machine column, the minimum manipulation required in switching from use of the roughing tool to the finishing tool, as well as other aspects of the construction as set forth more fully in the specification hereinafter following, by reference to the accompanying drawings, in which:

FIG. 1 is a front elevational view of the tracer milling machine of the invention, showing the roughing spindle in operating position and the finishing device in the nonuse position, with the work piece and model shown in dot-dash lines;

FIG. 2 is a top plan view of the machine of FIG. 1, and particularly showing the roughing spindle head and associated tracer in different operating positions in phantom lines;

FIG. 3 is a side elevational view of the machine of FIGS. 1 and 2, with parts omitted, and showing in schematic phantom the gearing connection between the motor and roughing spindle head;

Figure 4:
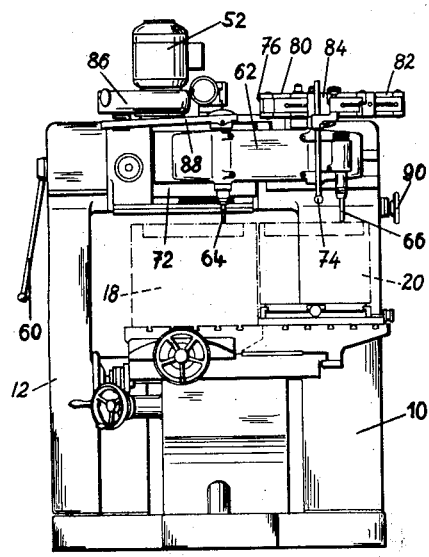
FIG. 4 is a front plan view, similar to FIG. 1, but showing the manual finishing device in operating position.

In contrast to the tracer milling machines of the prior art, previously mentioned, the present invention is directed to a machine tool of the type having a table for work piece and model movable in three directions, characterized by a tool head rotatable about a horizontal axis. The sides of the rotatable tool head which are disposed parallel to the axis of rotation are provided with a surface to receive a roughing tool to which one feeler member is assigned, and on another side the tool head is provided with a device for carrying a tool and a second feeler for hand-guided finishing operations. These two different tools are brought into working position alternately by rotation of the tool head, to which they are connected. This design enables the tool head to be fastened in advantageous manner at its opposite ends between the main machine column and an auxiliary column. This way, a machine body like a portal is arrived at, which is particularly favorable for ruggedness of the machine, and the tool head is a beam supported at opposite ends, which is the most favorable shape to counteract bending moments transferred to the machine during machining operations. The roughing tool may be designed as a miller or a drill, or even as a slotting tool or grinding spindle, while the finishing tool preferably comprises a movable beam parallelogram mechanism guided by a pantograph.

Referring to the drawings in greater detail, the machine frame comprises spaced upright column 10 and auxiliary column 12 disposed on opposite sides of console 14, on the top surface of which is connected a table 16 for supporting a work piece 18 and model 20, shown in phantom lines. The table 16 is constructed in the usual manner and is movable in three directions, with movement imparted thereto in the known manner by handwheels 22 for transverse movement, 24 for longitudinal movement and 26 for vertical movement. On the right hand portion of table 16 is arranged a cross table 28 for receiving a model 20. Cross table 28 is constructed in the usual manner and is transversely movable by handwheel 30 and longitudinally movable by handwheel 32. In the upper part of the machine a tool head 34 is supported at opposite ends between column 10 and auxiliary column 12, so that it is able to rotate around a horizontal axis through the tops of the columns.

In the preferred design of the invention, the sides of the tool head 34, carrying the receiving surfaces for the roughing tool 42 and the manual finishing device 62–72, are disposed generally at right angles to each other so that the tool head 34 must be turned by 90° to change the machine from roughing operation to finishing operation and vice versa. It is advantageous, thereby, to have the side carrying the manual finishing device pointing upwards when the roughing tool 42 is in operating position. This arrangement is very practical because then the manual finishing device does not have to be turned into the free space inside the portal comprised by the tool head 34 and columns 10 and 12, and the dimensions of the finishing device are independent of the limited size of the space beneath the portal. The front side of auxiliary column 12 carries a horizontal guide 36 disposed in line registration with a horizontal guide 38 on the tool head 34, on which a spindle head 40 for the roughing tool 42 is slidably connected for movement parallel to the horizontal axis of rotation of the tool head as shown particularly in FIGS. 1 and 2. Spindle head 40 can be secured in three different operating positions, along guide 38, as partially illustrated in FIG. 2 by broken lines. When the spindle head 40 and its roughing tool 42 are not in use it can be slid from guide 38 of tool head 34 onto guide 36 of the auxiliary column 12, as shown more particularly in FIG. 5. In this position of the spindle head, tools for other machining operations can be placed on guide 38 if, according to the model, for instance drilling, grinding, slotting, or similar operations are to be performed. According to another feature of the invention, by sliding the roughing tool spindle head onto the adjacent column this also leaves the guide 38 on the tool head empty when it is rotated downwardly to face the table 16 as the manual finishing parallelogram device 62–72 is brought into the operating position over the table. In some instances when the work piece 18 is relatively high, the spindle head will not clear the top of the work piece to enable it to be pivoted to a position beneath the portal and behind the workpiece, so by sliding the spindle head off the tool head onto the column 12 and leaving the tool head guide 38 empty there is no obstruction to contact the work piece and prevent the finishing device from being rotated into operating position.

Assigned to roughing tool 42 is a feeler element 44, fastened to a rotatable arm 46 which is horizontally movable in a guide 48, fastened to column 10, in the same manner as the spindle head 40 is horizontally movable in guide 38. Arm 46 and spindle head 40 are connected by rod 50 whereby equal distance is maintained between roughing tool 42 and feeler 44 during the roughing operation. It should be noted that feeler element 44 is connected directly to the rigid machine column 10 and in this position it is to a high degree independent of vibrations to which the roughing tool 42 and the tool head 34 are subjected in roughing operations due to their contact and proximity to the work piece. This appreciable decrease in vibration of the feeler is particularly important in milling machines of the type where the feeler is designed as the tracer of an automatic control.

Figure 5:
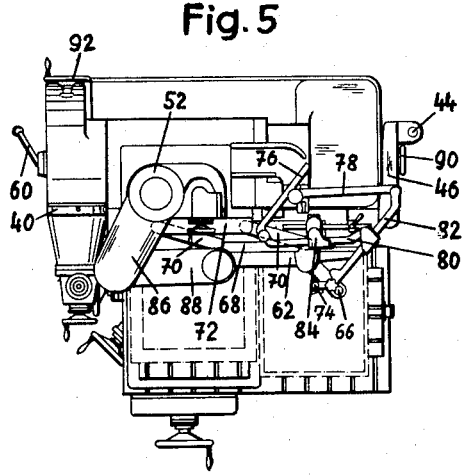
FIG. 5 is a top plan view of the machine of FIG. 4, and particularly showing the roughing spindle head moved to the nonuse position on the machine column with the associated tracer pivoted out of the work range.

As previously stated feeler 44 is fastened to a rotatable arm 46. This arm is pivotally connected to a carriage which engages guide 48 and the arm when disconnected from spindle head 40 by releasing the rod connector 50, can be moved to the extreme right end of guide 48 and then rotated or pivoted counterclockwise in the horizontal plane to a position adjacent the side surface of column 10 as indicated in FIG. 5. This arrangement together with the provision of moving the spindle head 40 onto the column 12 results in being able to completely clear the vertical space above the table 16 so that heavy work pieces can be lowered by a crane to the table and received by it without obstacles. This also clears the area above the model 20 for the feeler 66 of the finishing device when the latter is rotated into operating position.

As previously indicated tool head 34 is journaled for rotation on a horizontal axis between the machine columns 10 and 12 by means of trunnions or the like extending into the columns. As indicated in dotted lines in FIG. 6, handwheel 92 is geared through a worm drive or the like with the mounting trunnions of tool head 34 whereby the latter can be rotated by means of wheel 92 between two limit stops not illustrated. The rotation of the tool head can be limited to approximately 90° and a rotatable lever 60 at one end of the machine, geared to the rotatable axis of the tool head, serves to unlock the tool head 34 when it is to be rotated, and to secure it in position by means of a friction engagement mechanism or the like, well known in the art.

Provided on tool head 34 is a motor 52 which is connected to the roughing spindle 42 via clutch 54 and gear box 56 shown schematically in dotted lines within tool head 34 in FIG. 3. The roughing spindle 42 may be raised and lowered by handwheel 58 and when the spindle head 40 is moved onto column 12 it is disconnected from the gear box in the usual manner.

On one side of tool head 34, parallel to its axis of rotation, disposed in the same manner as guide 38, and at right angles to the plane of guide 38, the tool head carries a manual finishing device whose details are only briefly described herein because they have been well known to the experts in the art for a long time.

Figure 6:
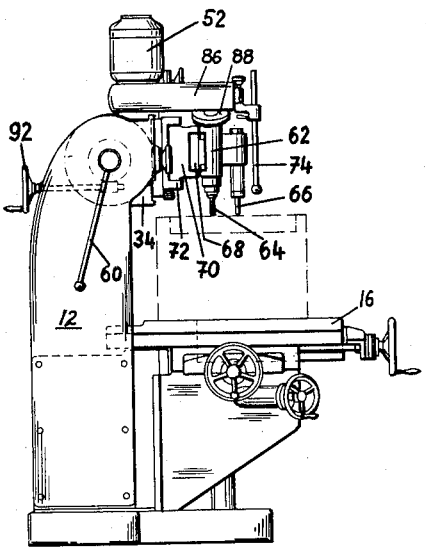
FIG. 6 is a side elevational view of the machine of FIG. 4.

This device is best recognizable from FIGS. 4–6 as a standard type parallelogram mechanism. It consists of a beam 62 carrying a finishing tool 64 at one end and a feeler 66 at the opposite end. Beam 62 is horizontally slideably movable on a carrier member 68 which, with oppositely disposed pivot links 70 and slide 72 forms a parallelogram mechanism of the usual form. Slide 72 is connected for vertical movement in vertical guides connected on the tool head 34 in the same manner as guide 38. Through this arrangement, beam 62 is freely movable in all three directions, always remaining parallel to itself. Movement is effected manually by a guide rod 74 situated on a pantograph 76–82, of the usual type, with which beam 62 is connected via connector 84 in the usual manner. Finishing tool 64 is belt-driven in the usual manner by motor 52, the belt enclosures being designated as 86 and 88. The weight of the entire manual finishing arrangement is compensated by a counterweight inside column 10, whereby the compensation effect can be regulated by handwheel 90. It is to be understood that when the motor 52 is connected to drive finishing tool 64 it is disconnected via clutch 54 from roughing tool 42, and vice versa.

The part of table 16 carrying work piece 18 extends, as may be seen from FIGS. 3 and 6, into the free space between column 10 and auxiliary column 12, somewhat beneath tool head 34. The horizontal distance between the column face and the working tool in the working position is smaller than that to the associated feeler element.

In the position illustrated in FIGS. 1–3, the machine serves for rough milling operations. To obtain the position the manual finishing apparatus 62–72 is rotated upwards and the rough milling tool 42 is then located above work piece 18. If feeler 44 is designed as an automatically controlled tracer, table 16 is moved by a control aggregate, not illustrated, which drives the spindles on handwheels 22, 24 and 26 automatically. Transverse movement of the table by the spindle of handwheel 22 is limited by the free opening between column 10 and auxiliary column 12, since the table extends into the space between the columns. An expansion of the working area in the transverse direction can be achieved by lateral movement of spindle head 40 on guide 38 to one of the three positions shown in FIG. 2. Feeler 44 partakes in these lateral movements due to the rod connector 50 so that the distance between feeler 44 and tool 42 always remains the same. In order to be able to place heavy work pieces on table 16, as previously indicated, spindle head 40 is pushed onto guide 36 of auxiliary column 12, after disconnecting rod 50, and feeler 44 is rotated backwards as shown in FIG. 5.

When the manual finishing device is to be used, as illustrated in FIGS. 4–6, spindle head 40 is again pushed onto guide 36, feeler 44 rotated backwards and then tool head 34 is turned by 90° clockwise by handwheel 92 looking at the end shown in FIGS. 3 and 6, which puts the manual finishing device into operating position. By actuation of clutch 54 the driving force is switched from gear box 56 to the belt drive of the finishing spindle 64.

While the invention has been described in certain preferred embodiments, it is realized that modifications can be made and it is to be understood that no limitations on the invention are intended other than those imposed by the scope of the appended claims.

What is claimed as new and desired to be secured by Letters Patent of the United States, is as follows:

1. A tracer milling machine of the type having a table for a work piece and a model adapted for movement in three directions comprising: a pair of machine columns disposed in spaced relation, a tool head connected for rotation about a horizontal axis between said machine columns, said tool head carrying faces disposed parallel to the axis of rotation, a roughing tool, surface means carrying said roughing tool connected to one of said faces, a first feeler connected to said roughing tool, a finishing device having a tool and second feeler connected to another of said faces, whereby said roughing tool and finishing device are alternately brought into working position above the table by rotation of said tool head.

2. A tracer milling machine as set forth in claim 1 in which said tool head is connected at opposite ends to said pair of machine columns.

3. A tracer milling machine as set forth in claim 1 in which the faces of said tool head carrying said surface means and said finishing device are disposed generally at right angles to each other.

4. A tracer milling machine as set forth in claim 1 in which said first feeler connected to said roughing tool is connected for movement on one of said machine columns.

5. A tracer milling machine as set forth in claim 4 in which said first feeler is mounted for sliding movement on one of said machine columns and is adapted to pivot in a horizontal plane when disconnected from said roughing tool.

6. A tracer milling machine as set forth in claim 1 in which said surface means is a first horizontal guide in which said roughing tool is horizontally movable, and said roughing tool adapted to be secured in selected spaced positions along said first horizontal guide.

7. A tracer milling machine as set forth in claim 6 including a second horizontal guide on one of said machine columns, and said first feeler horizontally movable in said second horizontal guide in unison with the movement of said roughing tool in said first horizontal guide.

8. A tracer milling machine as set forth in claim 1 including a third horizontal guide connected on one of said columns in horizontal alignment with said surface means on the tool head in one of its rotational positions, whereby said roughing tool is movable along said surface means off of said tool head and onto said third horizontal guide.

9. A tracer milling machine as set forth in claim 1 including a drive motor connected to said tool head, clutch means and gear means connected between said roughing tool, said finishing device and said drive motor whereby said drive motor is selectively coupled with said roughing tool in one position of said clutch and with said finishing device in the other position of said clutch.

10. A milling machine comprising a pair of machine columns disposed in spaced relation, a table having a work piece portion and a model portion adapted for movement in a plurality of directions connected to the base of said columns, a tool head connected for rotation about a horizontal axis between said machine columns, said tool head carrying faces disposed parallel to the axis of rotation, a roughing tool, a horizontal guide carrying said roughing tool connected to one of said faces, a first feeler member connected to said roughing tool, a finishing device having a tool and second feeler member connected to another of said faces, and the work piece portion of said table extending into the space between said pair of machine columns, whereby said roughing tool and finishing device are alternately brought into working position above said table by rotation of said tool head.

11. A milling machine as set forth in claim 10 in which the horizontal distance from said pair of machine columns to said roughing tool and said tool of said finishing device in the working positions is smaller than the horizontal distance to said first and second feeler members respectively.

References Cited by the Examiner

UNITED STATES PATENTS 3,085,477   4/63   Zwick _____ 90—13.1
3,117,495   1/64   Zwick _____ 90—13.1

WILLIAM W. DYER, Jr., *Primary Examiner.*

LEON PEAR, *Examiner.*